United States Patent
Iyer et al.

(10) Patent No.: US 7,383,386 B1
(45) Date of Patent: Jun. 3, 2008

(54) MULTI PARTITIONED STORAGE DEVICE EMULATING DISSIMILAR STORAGE MEDIA

(75) Inventors: Sree Mambakkam Iyer, San Jose, CA (US); Larry Lawson Jones, Palo Alto, CA (US); Arockiyaswamy Venkidu, Menlo Park, CA (US); Venkatesalu Rajagopal, Tamilnadu (IN)

(73) Assignee: MCM Portfolio LLC, Cupertino, CA (US)

( * ) Notice: Subject to any disclaimer, the term of this patent is extended or adjusted under 35 U.S.C. 154(b) by 221 days.

(21) Appl. No.: 10/850,813

(22) Filed: May 21, 2004

(51) Int. Cl.
G06F 12/00 (2006.01)
(52) U.S. Cl. ........................ 711/115; 711/103; 711/173
(58) Field of Classification Search ...................... None
See application file for complete search history.

(56) References Cited

U.S. PATENT DOCUMENTS

| | | | |
|---|---|---|---|
| 5,752,009 A * | 5/1998 | Nakahara et al. | 703/23 |
| 5,835,589 A * | 11/1998 | Nakashima | 705/51 |
| 6,609,173 B1 * | 8/2003 | Watkins | 711/103 |
| 6,704,824 B1 * | 3/2004 | Goodman | 710/300 |
| 6,715,043 B1 * | 3/2004 | Stevens | 711/154 |
| 6,986,030 B2 * | 1/2006 | Shmueli et al. | 713/1 |
| 2002/0046338 A1 * | 4/2002 | Ueda et al. | 713/168 |
| 2002/0052728 A1 * | 5/2002 | Yutaka | 703/26 |
| 2002/0143637 A1 * | 10/2002 | Shmueli et al. | 705/26 |
| 2002/0145632 A1 * | 10/2002 | Shmueli et al. | 345/835 |
| 2002/0147653 A1 * | 10/2002 | Shmueli et al. | 705/26 |
| 2002/0147912 A1 * | 10/2002 | Shmueli et al. | 713/182 |
| 2002/0162009 A1 * | 10/2002 | Shmueli et al. | 713/200 |
| 2003/0163610 A1 * | 8/2003 | Stevens | 710/8 |
| 2003/0167376 A1 * | 9/2003 | Koh | 711/115 |
| 2003/0225971 A1 * | 12/2003 | Oishi et al. | 711/115 |
| 2004/0193744 A1 * | 9/2004 | Paley et al. | 710/5 |
| 2004/0199909 A1 * | 10/2004 | Goodman | 717/168 |
| 2005/0015540 A1 * | 1/2005 | Tsai et al. | 711/103 |
| 2005/0066129 A1 * | 3/2005 | Chang et al. | 711/115 |
| 2005/0083741 A1 * | 4/2005 | Chang et al. | 365/200 |
| 2005/0120146 A1 * | 6/2005 | Chen et al. | 710/22 |

FOREIGN PATENT DOCUMENTS

JP 07271525 A * 10/1995

* cited by examiner

*Primary Examiner*—Kevin Verbrugge
(74) *Attorney, Agent, or Firm*—John P. Ward; Greenberg Traurig, LLP

(57) ABSTRACT

A digital media. In one embodiment, the digital media devices includes a storage unit/partition that emulates a Compact Disc-Read Only Memory (CD-ROM), and optionally, a second storage unit/partition that acts as a Read/Write storage device.

16 Claims, 3 Drawing Sheets

MULTI PARTITIONED STORAGE DEVICE EMULATING DISSIMILAR STORAGE MEDIA

FIELD OF THE INVENTION

The field of the invention relates generally to storage devices, and in particular, to a multi-partitioned storage device emulating dissimilar storage media.

BACKGROUND

Handheld devices such as cell phones, personal digital assistants (PDAs), etc. are becoming more powerful, with capabilities to capture still and motion pictures. The operating system for these devices are also becoming more sophisticated with expanded features. These devices are compact and hence, do not come with a CD ROM reading capability.

SUMMARY OF THE INVENTION

A digital media device is described herein. In one embodiment, the digital media devices includes a storage unit/partition that emulates a Compact Disc-Read Only Memory (CD-ROM), and optionally, a second storage unit/partition that act as a Read/Write storage device.

Emulating a CD ROM has several advantages considering popular operating systems such as Windows XP®, Windows 2000®, etc. allow applications to be automatically launched upon plugging into the storage device. For example, the digital media device, as described herein, may act as a substitute for CD ROM drives on handheld devices such as cell phones, personal digital assistants, etc. which do not have CD ROM drives. In particular, the CD portion of the digital media device can be formatted to hold any software, which need to be installed on the host.

Furthermore, in one embodiment, the Read/Write unit/partition of the digital media device can be used as a card reader for different flash card formats and also as a storage device with these cards. The Read/Write part of the device can also be used as a storage device with onboard flash.

BRIEF DESCRIPTION OF THE DRAWINGS

The invention is illustrated by way of example and not limitation in the figures of the accompanying drawings, in which like references indicate similar or identical elements, and in which.

DETAILED DESCRIPTION

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
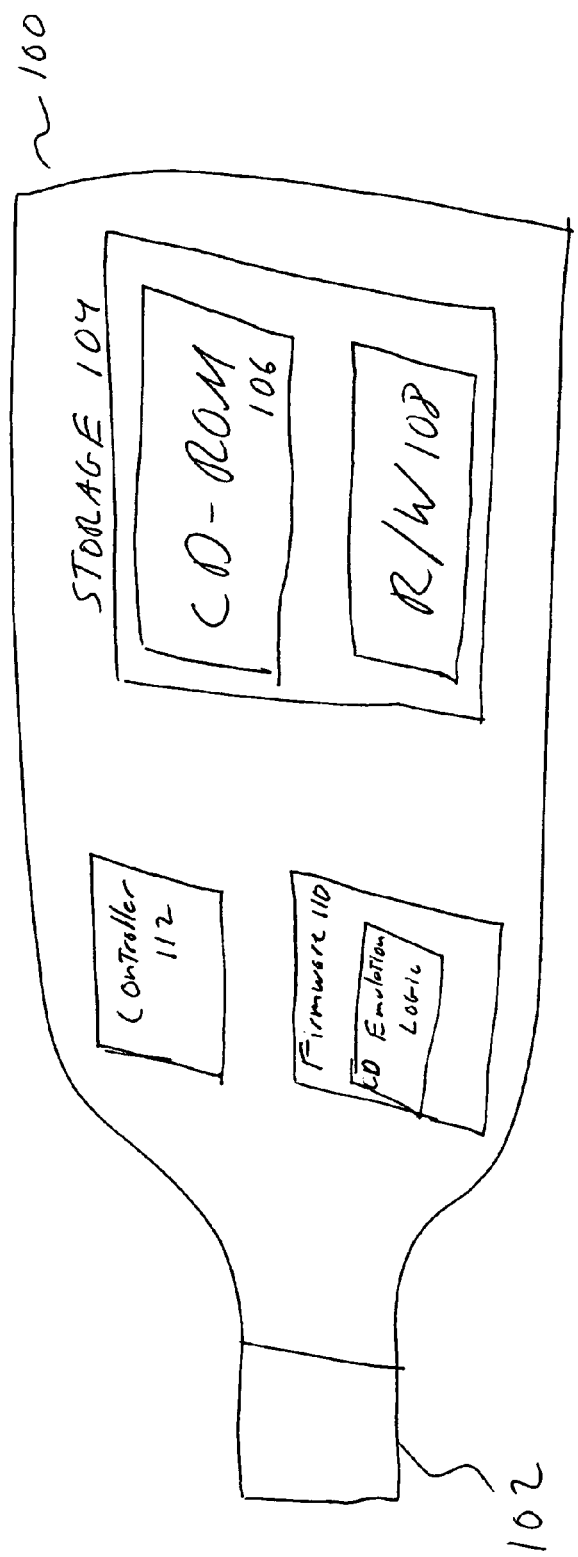
FIG. 1 illustrates one embodiment of a digital media device, which includes a one partition that emulates a CD ROM 106 and a second partition that provides a Read/Write storage unit.

FIG. 1 illustrates one embodiment of a digital media device 100, which includes a storage unit 104 that includes one partition that emulates a CD ROM 106 and a second partition that provides a Read/Write storage unit 108. In one embodiment, the CD ROM partition is to store a driver for the digital media device, which is to be launched when the digital media device is connected to a computing device. In addition, as set forth above, in one embodiment, the Read/Write unit/partition of the digital media device can be used as a card reader for different flash card formats and also as a storage device with these cards. Alternatively the Read/Write part of the device can also be used as a storage device with onboard flash.

As described herein, the digital media device may also be referenced as a flash drive or a storage device. The storage unit 104 of the digital media device, in one embodiment, comprises of flash memory. In other embodiments, alternative erasable, rewriteable memory may be used in place of the flash memory.

In one embodiment, the digital media device further includes a connector interface 102. In one embodiment, the connecting interface is configured to be inserted into a Universal Serial Bus (USB) port of a computing device, such a cellular phone or PDA. In alternative embodiments, the connector interface may be configured to be inserted into alternative ports. For example, in one embodiment, the connector interface 102 may be configured to interface with a small computer system interface (SCSI).

In one embodiment, the digital media device has a form factor comparable to the size of a key chain. In alternative embodiments, the digital media device may have a form factor of alternative sizes, including larger than or small than the size of a key chain.

In one embodiment, the storage unit 104 of the digital media device consists of 32 megabytes. In one embodiment, 24 megabytes are allocated to the Read/Write partition and 8 megabytes are allocated to the CD ROM. In alternative embodiments, the digital media device may be of an alternative size, and alternative allocations may be provided to the Read/Write partition and the CD ROM partition. It is also envisioned that some embodiments would require that the entire capacity of the digital media be used to emulate a CD-ROM.

Figure 2:
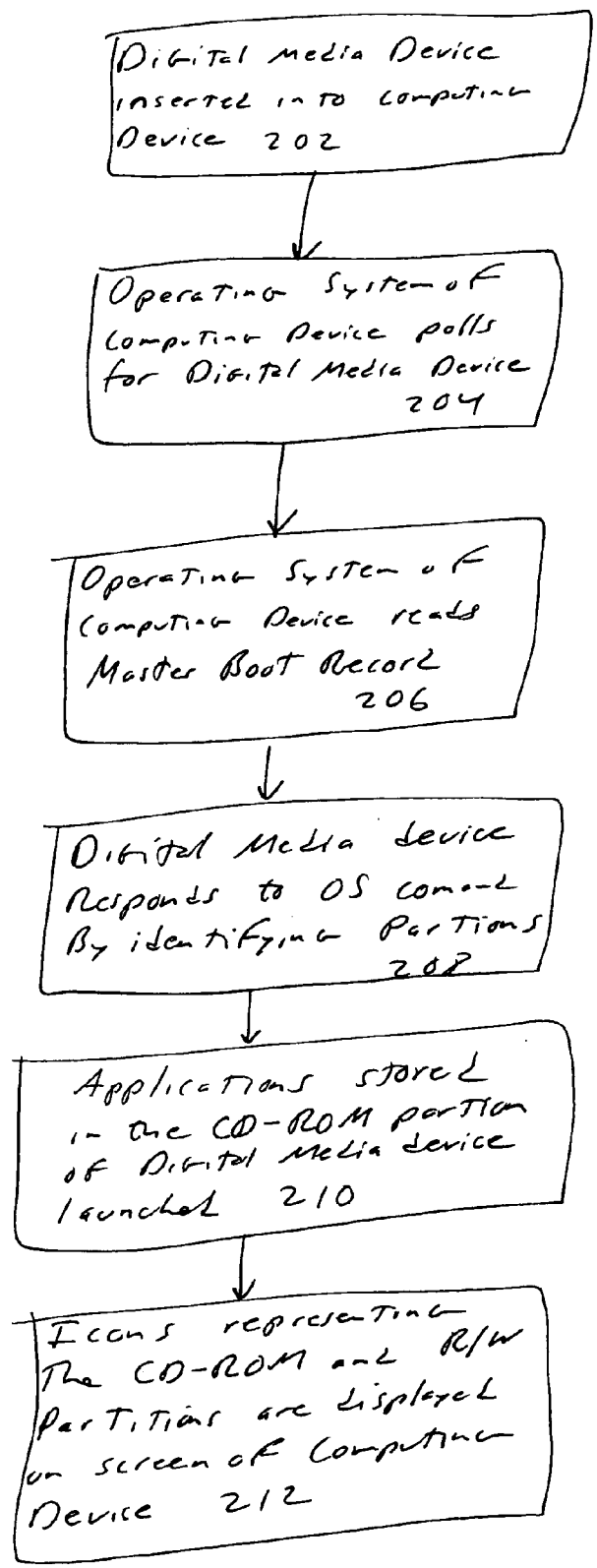
FIG. 2 is a flow diagram describing the processes of connecting the digital media device to a computing device in accordance with one embodiment.
Figure 3:
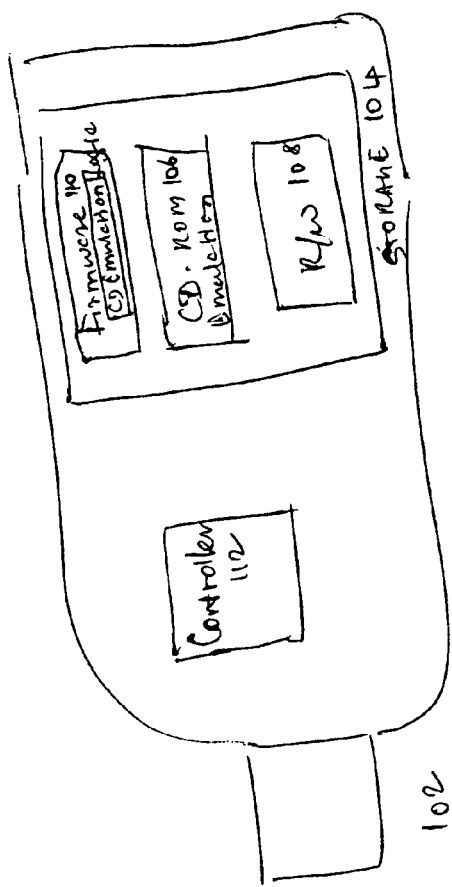
FIG. 3 illustrates an alternative embodiment of FIG. 1, where the firmware for the controller also resides in the flash memory itself. Thus the flash memory not only houses two partitions (CD-ROM and Removable storage), it contains the firmware that can be upgraded in the field.

In one embodiment, the digital media device further includes a controller 112 that contains circuitry to run the digital media device, and firmware 110 that provides logic to emulate the CD ROM partition 106 of the storage unit as a CD ROM. In one embodiment, as illustrated in FIG. 3, the firmware 110 may be an additional partition of the storage unit 104. Alternatively, as illustrated in FIG. 1, the firmware 110 may be a separate storage unit within the digital media device 100. The digital media device emulates the command responses of a CD-ROM and also supports the CD-ROM file systems, which are considerably different from a digital media device file system, such as FAT16 or FAT32. Using application software, the partitioning (sizes for CD-ROM and storage portions) can be changed at any time FIG. 2 is a flow diagram describing the processes of connecting the digital media device to a computing device in accordance with one embodiment. In process 202, the digital media device is inserted into a port of the mobile computing device, such as a cellular phone or PDA. In one embodiment, the digital media device is inserted into a Universal Serial Bus (USB) port. In alternative embodiments, the digital media device could be inserted into different ports of the computing device.

In process 204, an operating system of the computing device polls the separate ports of the computing device to detect the presence of a device having been inserted into a port. When the operating system polls the USB port, in one embodiment, the operating system detects the presence of the digital media device having been inserted into the USB port.

In process 206, the operating system reads a master boot record of the digital media device and identifies multiple partitions of the digital media device. In process 208, the operating system issues a command to the digital media device to identify the separate partitions. In one embodiment, the digital media device responds by identifying a first partition as a CD ROM and a second partition as a Read/Write storage unit.

In process 210, the operating system proceeds to transfer control to one or more applications on the computing device to access and launch applications stored on the CD ROM partition of the digital media device. In the case of a digital media device driver being launched, the driver is to provide support for the digital media device to interoperate with the computing device.

In process 212, the digital media device driver causes two icons to be displayed on a screen of the mobile computing device. A first icon represents the CD ROM partition of the digital media device and a second icon represents a Read/Write partition of the digital media device. In one embodiment, the icons include a graphical user interface representations of the CD ROM partition and the Read/Write partition of the storage device.

The processes described above can be stored in a memory of the digital media device as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EEPROM's).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in them selves recite only those features regarded as essential to the invention.

The invention claimed is:

1. An apparatus comprising:
   a connector to connect to a computing device;
   a first storage partition having a Read Only Memory (ROM) storage unit;
   a Read/Write storage unit comprising a card-reader for accepting a flash memory card, the flash memory card comprising a second storage partition;
   firmware to emulate a CD-ROM using the ROM; and
   a master boot record to identify at least two partitions of the apparatus including the ROM storage unit and the Read/Write storage unit.

2. The apparatus of claim 1, wherein the apparatus is a digital media device, the ROM storage unit comprises a flash memory and the Read/Write storage unit comprises a flash memory.

3. The apparatus of claim 2, wherein the application or task is configured to launch automatically when the apparatus is plugged into the computing device.

4. The apparatus of claim 2, wherein the Read/Write storage unit comprises an on-board flash memory.

5. The apparatus of claim 1, wherein the ROM is configured to store an application or task to support the apparatus interfacing with the computing device.

6. The apparatus of claim 5, wherein the computing device is a mobile computing device.

7. The apparatus of claim 6, wherein the mobile computing device is one of a cellular phone, personal digital assistant (PDA), and a digital camera.

8. The apparatus of claim 5, wherein the application or task is configured to display two icons on a screen of the computing device, a first icon representing the ROM storage unit and a second icon representing the Read/Write storage unit.

9. The apparatus of claim 1, wherein the connector is configured to interface with a Universal Serial Bus (USB) port of the computing device.

10. The apparatus of claim 1, wherein the computing device does not include a CD-ROM drive.

11. A method comprising:
    accessing a master boot record to identify at least two partitions of the apparatus including a Read Only Memory (ROM) storage unit and a Read/Write storage unit;
    providing a portion of a first storage partition from the ROM storage unit to a computing device;
    providing a portion of a second storage partition from the Read/Write storage unit comprising a card-reader for accepting a flash memory card, the flash memory card comprising a second storage partition; and
    emulating a CD-ROM using the ROM.

12. The method of claim 11 further comprising:
    storing an application or task in the ROM, the application or task interfacing with the computing device.

13. The method of claim 12, further comprising:
    displaying two icons on a screen of the computing device, a first icon representing the ROM storage unit and a second icon representing the Read/Write storage unit.

14. A machine-readable medium having stored thereon a set of instructions that when executed on a machine will cause the machine to perform a method comprising:
    accessing a master boot record to identify at least two partitions of the apparatus including a ROM storage unit and a Read/Write storage unit;

providing a portion of a first storage partition from the ROM storage unit to a computing device;
providing a portion of a second storage partition from the Read/Write storage unit comprising a card-reader for accepting a flash memory card, the flash memory card comprising a second storage partition; and
emulating a CD-ROM using the ROM.

15. The machine-readable medium of claim 14 comprising instructions for:

storing an application or task in the ROM, the application or task interfacing with the computing device.

16. The machine-readable medium of claim 15, comprising instructions for:
displaying two icons on a screen of the computing device, a first icon representing the ROM storage unit and a second icon representing the Read/Write storage unit.

* * * * *